United States Patent
Tagawa et al.

(10) Patent No.: US 9,242,640 B2
(45) Date of Patent: Jan. 26, 2016

(54) HYBRID VEHICLE CONTROL DEVICE

(75) Inventors: Masaaki Tagawa, Hamamatsu (JP); Yoshiki Ito, Hamamatsu (JP); Yukihiro Hosoe, Hamamatsu (JP); Hitoshi Ohkuma, Hamamatsu (JP)

(73) Assignee: SUZUKI MOTOR CORPORATION, Hamamatsu-shi, Shizuoka (JP)

( * ) Notice: Subject to any disclaimer, the term of this patent is extended or adjusted under 35 U.S.C. 154(b) by 306 days.

(21) Appl. No.: 13/984,865

(22) PCT Filed: Feb. 16, 2011

(86) PCT No.: PCT/JP2011/053257
§ 371 (c)(1), (2), (4) Date: Nov. 13, 2013

(87) PCT Pub. No.: WO2012/111111
PCT Pub. Date: Aug. 23, 2012

(65) Prior Publication Data
US 2014/0058605 A1 Feb. 27, 2014

(51) Int. Cl.
*B60L 9/00* (2006.01)
*B60L 11/00* (2006.01)
(Continued)

(52) U.S. Cl.
CPC ............. *B60W 20/108* (2013.01); *B60K 6/445* (2013.01); *B60W 10/06* (2013.01); *B60W 10/08* (2013.01);
(Continued)

(58) Field of Classification Search
CPC ... B60W 20/108; B60W 10/06; B60W 10/08; B60W 10/196
USPC .......................................................... 701/22
See application file for complete search history.

(56) References Cited

U.S. PATENT DOCUMENTS

2004/0070270 A1* 4/2004 Gunji ....................... B60K 6/52
303/152
2008/0297073 A1* 12/2008 Yatabe ................... B60K 6/365
318/51

FOREIGN PATENT DOCUMENTS

JP      06-055941      3/1994
JP      09-074605      3/1997
(Continued)

OTHER PUBLICATIONS

Form PCT/ISA/210 International Search Report issued in International Application No. PCT/JP2011/053257 with English translation, date of mailing May 17, 2011 (5 pages).

*Primary Examiner* — Helal A Algahaim
*Assistant Examiner* — Mahmoud Ismail
(74) *Attorney, Agent, or Firm* — Flynn, Thiel, Boutell & Tanis, P.C.

(57) ABSTRACT

A controller for a hybrid vehicle includes a maximum regeneration torque calculator which calculates a motor generator maximum regeneration torque necessary for supplying power to an electricity storer and calculates each of an engine operation maximum regeneration torque for operating an engine changing in accordance with a vehicle speed and an engine stop maximum regeneration torque and a change value calculator which sets an engine stop prohibition vehicle speed in which an engine is not stopped when a vehicle speed is equal to or faster than a predetermined vehicle speed and calculates a maximum regeneration torque when stopping the engine at the engine stop prohibition vehicle speed as a maximum regeneration torque change threshold value from the engine stop regeneration torque of the maximum regeneration torque calculator.

1 Claim, 7 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60W 20/00* (2006.01)
  *B60W 10/06* (2006.01)
  *B60W 10/08* (2006.01)
  *B60W 30/18* (2012.01)
  *B60K 6/445* (2007.10)
  *B60W 10/196* (2012.01)

(52) U.S. Cl.
  CPC ............. *B60W 10/196* (2013.01); *B60W 20/00* (2013.01); *B60W 30/18127* (2013.01); *B60W 20/1062* (2013.01); *B60W 20/40* (2013.01); *B60W 2520/10* (2013.01); *B60W 2710/083* (2013.01); *Y02T 10/48* (2013.01); *Y02T 10/6239* (2013.01); *Y02T 10/6286* (2013.01); *Y10S 903/93* (2013.01)

(56) References Cited

FOREIGN PATENT DOCUMENTS

| | | |
|---|---|---|
| JP | 09-135502 | 5/1997 |
| JP | 2002-95106 A | 3/2002 |
| JP | 2005-313831 A | 11/2005 |

\* cited by examiner

HYBRID VEHICLE CONTROL DEVICE

TECHNICAL FIELD

The present invention relates to a hybrid vehicle, and particularly, to a hybrid vehicle which includes an engine and a motor generator (motor) as power sources and controls the plurality of power sources in order to output target drive power.

BACKGROUND ART

As vehicles, there is known a so-called hybrid vehicle which includes an engine and a motor generator (motor) other than the engine as drive sources and improves fuel efficiency (Japanese Unexamined Patent Application Publication No. 9-74605).

The hybrid vehicle outputs power generated from the engine and the motor generator to a drive shaft through a power transmitting mechanism.

In the hybrid vehicle, a battery input limit value is calculated based on the state of the battery as an electricity storing means, and a regeneration torque upper-limit value (maximum regeneration torque) is determined by dividing the calculated input limit value by the motor rotation speed of the motor generator. Accordingly, it is possible to prevent the power from being charged by the battery input limit value or more during the regeneration brake operation, and to prevent degradation of the battery.

CITATION LIST

Patent Literature

[PTL 1] Japanese Unexamined Patent Application Publication No. 2006-256591

In a power output device, an automobile equipped with the power output device, and a power output device control method according to PTL 1, a first motor generator (MG1) is controlled so that a negative torque is output from the first motor generator to stop the operation of the engine, and a second motor generator (MG2) is controlled so that a negative torque output from the second motor generator is limited based on the power generation amount of the first motor generator and the battery input limit value at this time. Accordingly, the torque which becomes insufficient due to the limitation of the torque with respect to the second motor generator is output from a brake device attached to a drive wheel.

SUMMARY OF INVENTION

Technical Problem

Incidentally, as the related art, in a hybrid vehicle (Japanese Unexamined Patent Application Publication No. 2002-281607), an output shaft of an engine, a first motor generator (MG1), a second motor generator (MG2), and a drive shaft connected to a drive wheel are connected to respective rotation components of a differential gear mechanism with four rotation components, and the power of the engine is combined with the power of each of the first motor generator (MG1) and the second motor generator (MG2) and is output to the drive shaft. Here, the maximum regeneration torque becomes the sum of the torques of the first motor generator (MG1) and the second motor generator (MG2) and the engine torque.

However, in such a hybrid vehicle, when a vehicle speed becomes lower than a threshold value, the vehicle runs only by the power of the first motor generator (MG1) and the second motor generator (MG2) by stopping the engine. For this reason, when the engine changes from an operation state to a stop state upon braking the vehicle, a torque corresponding to an engine friction is subtracted from the maximum regeneration torque even when there is no variation in battery input limit value. Accordingly, since the engine stopping operation is performed for a comparatively short time in consideration of the shock generated when stopping the engine, the maximum regeneration torque decrease in a short time.

For this reason, when the vehicle is braked with the maximum regeneration torque, a brake torque changes due to an abrupt variation in maximum regeneration torque. Particularly, in a hybrid vehicle that may arbitrarily determine a distribution of a regeneration brake and a hydraulic brake, the hydraulic brake needs to compensate a decrease in maximum regeneration torque. However, since the initial rise of the hydraulic brake is slower than that of the regeneration brake, a problem arises in that the deceleration of the vehicle becomes ineffective.

Therefore, it is an object of the invention to provide a hybrid vehicle which suppresses a variation in maximum regeneration torque generated when stopping an engine from an operation state of the engine in a vehicle braking state.

Solution to Problem

According to the invention, there is provided a hybrid vehicle which outputs power generated from an engine and a motor generator to a drive shaft through a power transmitting mechanism, the hybrid vehicle including: an electricity storing means which can exchange power with the motor generator; a vehicle speed detecting means which detects a vehicle speed; and a control means which includes a motor rotation speed calculating means that calculates a motor rotation speed of the motor generator, an input limiting means that limits the amount of power with respect to the electricity storing means based on a state of the electricity storing means, a motor generator regeneration torque calculating means that calculates a motor generator regeneration torque from at least a motor rotation speed calculated by the motor rotation speed calculating means and an input limit value set by the input limiting means, a maximum regeneration torque calculating means that calculates a motor generator maximum regeneration torque necessary for supplying power from the motor generator to the electricity storing means while a brake force is output to the drive shaft and calculates each of an engine operation maximum regeneration torque for operating the engine changing in accordance with the vehicle speed detected by the vehicle speed detecting means and an engine stop maximum regeneration torque for stopping the engine changing in accordance with the vehicle speed detected by the vehicle speed detecting means, and a change value calculating means that sets an engine stop prohibition vehicle speed in which the engine is not stopped when the vehicle speed is equal to or faster than a predetermined vehicle speed and calculates a maximum regeneration torque generated when stopping the engine at the engine stop prohibition vehicle speed as a maximum regeneration torque changing threshold value from the engine stop regeneration torque of the maximum regeneration torque calculating means, wherein the value of the maximum regeneration torque changing in accordance with the vehicle speed detected by the vehicle speed detecting means is compared with the engine operation maximum regeneration torque and the maximum regeneration torque changing threshold value calculated by the change value calculating means, the value of the engine operation maximum regeneration torque is set as the maximum regeneration torque in a first case where the engine operation maximum regeneration torque is larger than the maximum regeneration torque changing threshold value calculated by the change value calculating means, the value of the engine operation maximum regeneration torque is set as the maximum regeneration torque in a second case where the engine operation maximum regeneration torque is equal to or smaller than the maximum regeneration torque changing threshold value calculated by the change value calculating means and the engine stop maximum regeneration torque is smaller than the maximum regeneration torque changing threshold value calculated by the change value calculating means, and the maximum regeneration torque changing threshold value calculated by the change value calculating means is set as the maximum regeneration torque in a third case where the engine operation maximum regeneration torque is equal to or smaller than the maximum regeneration torque changing threshold value calculated by the change value calculating means and the engine stop maximum regeneration torque is equal to or larger than the maximum regeneration torque changing threshold value calculated by the change value calculating means.

Advantageous Effects of Invention

The hybrid vehicle of the invention may suppress a variation in maximum regeneration torque generated when stopping the engine from the operation state of the engine in the vehicle braking state.

DESCRIPTION OF EMBODIMENTS

The invention realizes an object of suppressing a variation in maximum regeneration torque generated when stopping an engine from an operation state of the engine in a vehicle braking state by setting a maximum regeneration torque according to a vehicle speed state.

Embodiment

Figure 1:
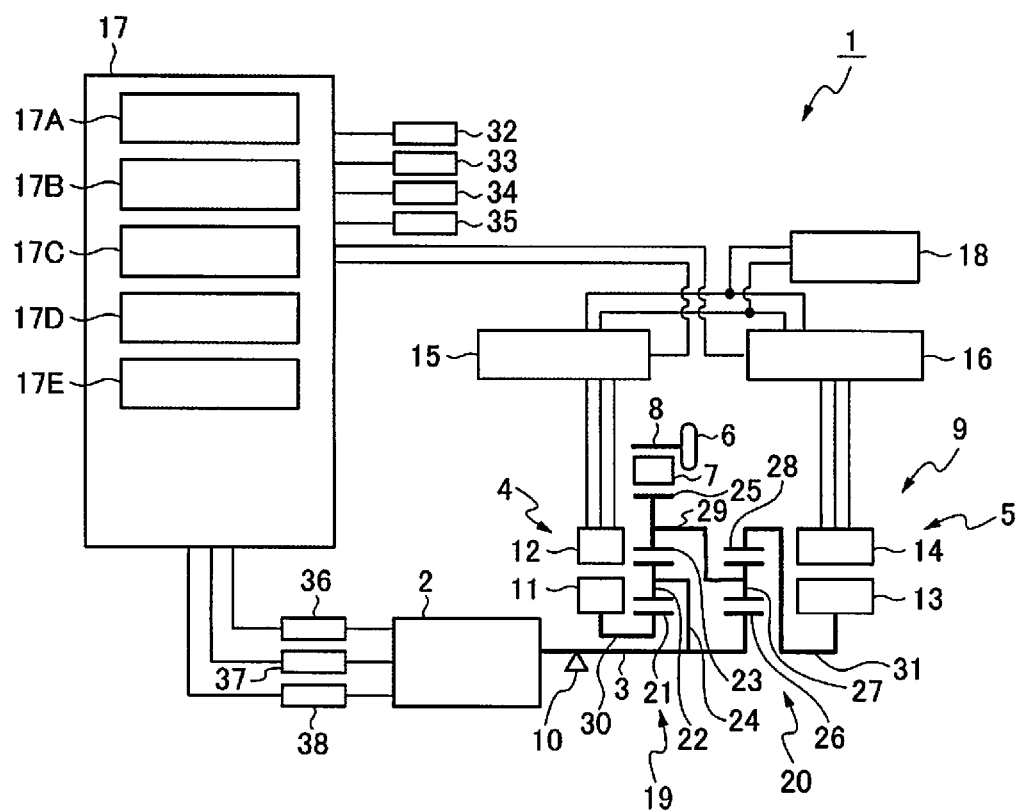
FIG. 1 is a system configuration diagram of a hybrid vehicle control device (embodiment).

FIGS. 1 to 7 illustrate an embodiment of the invention.
In FIG. 1, a control device 1 of a hybrid vehicle as an electric vehicle is provided.

The control device 1 includes an output shaft 3 of an engine (in the drawings, "ENG") 2 as a drive source which outputs a torque, a first motor generator (in the drawings, "MG1") 4 and a second motor generator (in the drawings, "MG2") 5 as a plurality of motor generators (motors), a drive shaft (in the drawings, "OUT") 8 which is connected to a drive wheel 6 through an output transmitting mechanism 7, and a power transmitting mechanism (differential gear mechanism) 9 which is connected to each of the output shaft 3 of the engine 2, the first motor generator 4, the second motor generator 5, and the drive shaft 8. That is, in the hybrid vehicle according to the embodiment, the power which is generated from the engine 1, the first motor generator 4, and the second motor generator 5 is output to the drive shaft 8 as the output shaft of the power transmitting mechanism 9 through the power transmitting mechanism 9.

A one-way clutch 10 is provided in the middle of the output shaft 3 of the engine 2 so as to be close to the engine 2. The one-way clutch 10 prevents the reverse rotation of the engine 2, and receives the torque reaction force of the second motor generator 5 in the EV (electric vehicle) running mode.

The first motor generator 4 includes a first rotor 11 and a first stator 12. The second motor generator 5 includes a second rotor 13 and a second stator 14.

Further, the control device 1 includes a first inverter 15 which controls the operation of the first motor generator 4, a second inverter 16 which controls the operation of the second motor generator 5, and a control means (ECU) 17 which is connected to the first inverter 15 and the second inverter 16.

The first inverter 15 is connected to the first stator 12 of the first motor generator 4. The second inverter 16 is connected to the second stator 14 of the second motor generator 5.

The respective power supply terminals of the first inverter 15 and the second inverter 16 are connected to a battery (driving high-voltage battery) 18 as an electricity storing means. The battery 18 may exchange power with the first motor generator 4 and the second motor generator 5.

In the control device 1, the driving of the hybrid vehicle is controlled by using the output of the engine 2, the first motor generator 4, and the second motor generator 5.

The power transmitting mechanism 9 is a so-called four-axis-type power input and output device, and has a configuration in which the output shaft 3 of the engine 2 and the drive shaft 8 are disposed, the first motor generator 4 near the engine 2 and the second motor generator 5 near the drive shaft 8 are disposed, the power of the engine 2, the power of the first motor generator 4, and the power of the second motor generator 5 are combined so as to output to the drive shaft 8, and power is transmitted and received among the engine 2, the first motor generator 4, the second motor generator 5, and the drive shaft 8.

The power transmitting mechanism 9 has a configuration in which a first planetary gear mechanism 19 and a second planetary gear mechanism 20, having two rotation components connected to each other, are provided in parallel.

The first planetary gear mechanism 19 includes a first sun gear 21, a first pinion gear 22 which meshes with the first sun gear 21, a first ring gear 23 which meshes with the first pinion gear 22, a first carrier 24 which is connected to the first pinion gear 22, and an output gear 25 which is connected to the first ring gear 23.

The second planetary gear mechanism 20 includes a second sun gear 26, a second pinion gear 27 which meshes with the second sun gear 26, a second ring gear 28 which meshes with the second pinion gear 27, and a second carrier 29 which is connected to the second pinion gear 27.

In the power transmitting mechanism 9, the first carrier 24 of the first planetary gear mechanism 19 is connected to the output shaft 3 of the engine 2. Further, the second carrier 29 of the second planetary gear mechanism 20 is connected to the first ring gear 23 and the output gear 25 of the first planetary gear mechanism 19.

The first rotor 11 of the first motor generator 4 is connected to the first sun gear 21 through the first motor output shaft 30. The output shaft 3 of the engine 2 is connected to the first carrier 24 and the second sun gear 26. The drive shaft 8 is connected to the first ring gear 23 and the second carrier 29 through the output gear 25 and the output transmitting mechanism 7. The second rotor 13 of the second motor generator 5 is connected to the second ring gear 28 through the second motor output shaft 31.

The second motor generator 5 may be directly connected to the drive wheel 6 through the second motor output shaft 31, the second ring gear 28, the second carrier 29, the first ring gear 23, the output gear 25, the output transmitting mechanism 7, and the drive shaft 8, and has a performance capable of causing a vehicle to run only by the output thereof.

That is, in the power transmitting mechanism 9, the first carrier 24 of the first planetary gear mechanism 19 and the second sun gear 26 of the second planetary gear mechanism 20 are coupled to each other so as to be connected to the output shaft 3 of the engine 2, the first ring gear 23 of the first planetary gear mechanism 19 and the second carrier 29 of the second planetary gear mechanism 20 are coupled to each other so as to be connected to the drive shaft 8, the first motor generator 4 is connected to the first sun gear 21 of the first planetary gear mechanism 19, the second motor generator 5 is connected to the second ring gear 28 of the second planetary gear mechanism 20, and power is transmitted and received among the engine 2, the first motor generator 4, the second motor generator 5, and the drive shaft 8.

The control means 17 is connected with an accelerator opening degree detecting means 32 which detects an accelerator stepping amount as an accelerator opening degree, a vehicle speed detecting means 33 which detects a vehicle speed, a battery charge state detecting means 34 which detects the charge state (SOC) of the battery 18, and an engine rotation speed detecting means 35 which detects an engine rotation speed.

Further, the control means 17 is connected with an air quantity adjusting mechanism 36, a fuel supply mechanism 37, and an ignition timing adjusting mechanism 38 so as to control the engine 2.

The control means 17 includes a motor rotation speed calculating means 17A, an input limiting means 17B, a motor generator regeneration torque calculating means 17C, a maximum regeneration torque calculating means 17D, and a change value calculating means 17E.

The motor rotation speed calculating means 17A calculates the motor rotation speeds of the first motor generator 4 and the second motor generator 5.

The input limiting means 17B limits the amount of power supplied to the battery 18 based on the state of the battery 18 as an electricity storing means.

The motor generator regeneration torque calculating means 17C calculates a motor generator regeneration torque from at least a motor rotation speed calculated by the motor rotation speed calculating means 17A and an input limit value for the battery 18 set by the input limiting means 17B.

The maximum regeneration torque calculating means 17D calculates a motor generator maximum regeneration torque necessary for supplying power from the first motor generator 4 and the second motor generator 5 to the battery 18 in a state where a brake force is output to the drive shaft 8, and calculates each of an engine operation maximum regeneration torque for operating the engine changing in response to the vehicle speed detected by the vehicle speed detecting means 33 and an engine operation maximum regeneration torque for operating the engine changing in response to the vehicle speed detected by the vehicle speed detecting means 33.

The change value calculating means 17E sets an engine stop prohibition vehicle speed in which the engine 2 is not stopped when the vehicle speed is equal to or faster than a predetermined vehicle speed, and calculates a maximum regeneration torque generated when stopping the engine 2 at the engine stop prohibition vehicle speed as a maximum regeneration torque changing threshold value from the engine stop regeneration torque of the maximum regeneration torque calculating means 17D.

In the control means 17, the value of the maximum regeneration torque changing in response to the vehicle speed detected by the vehicle speed detecting means 33 is set as below by using the engine stop maximum regeneration torque and the engine operation maximum regeneration torque calculated by the maximum regeneration torque calculating means 17D.

As a result of a comparison between the engine operation maximum regeneration torque and the maximum regeneration torque changing threshold value calculated by the change value calculating means, in a first case in which the engine operation maximum regeneration torque is larger than the maximum regeneration torque changing threshold value calculated by the change value calculating means 17E, the value of the engine operation maximum regeneration torque is set as the maximum regeneration torque. As a result of a comparison, in a second case in which the engine operation maximum regeneration torque is equal to or smaller than the maximum regeneration torque changing threshold value calculated by the change value calculating means 17E and the engine stop maximum regeneration torque is smaller than the maximum regeneration torque changing threshold value calculated by the change value calculating means 17E, the value of the engine stop maximum regeneration torque is set as the maximum regeneration torque. As a result of a comparison, in a third case in which the engine operation maximum regeneration torque is equal to or smaller than the maximum regeneration torque changing threshold value calculated by the change value calculating means 17E and the engine stop maximum regeneration torque is equal to or larger than the maximum regeneration torque changing threshold value calculated by the change value calculating means 17E, the maximum regeneration torque changing threshold value calculated by the change value calculating means 17E is set as the maximum regeneration torque.

Figure 5:
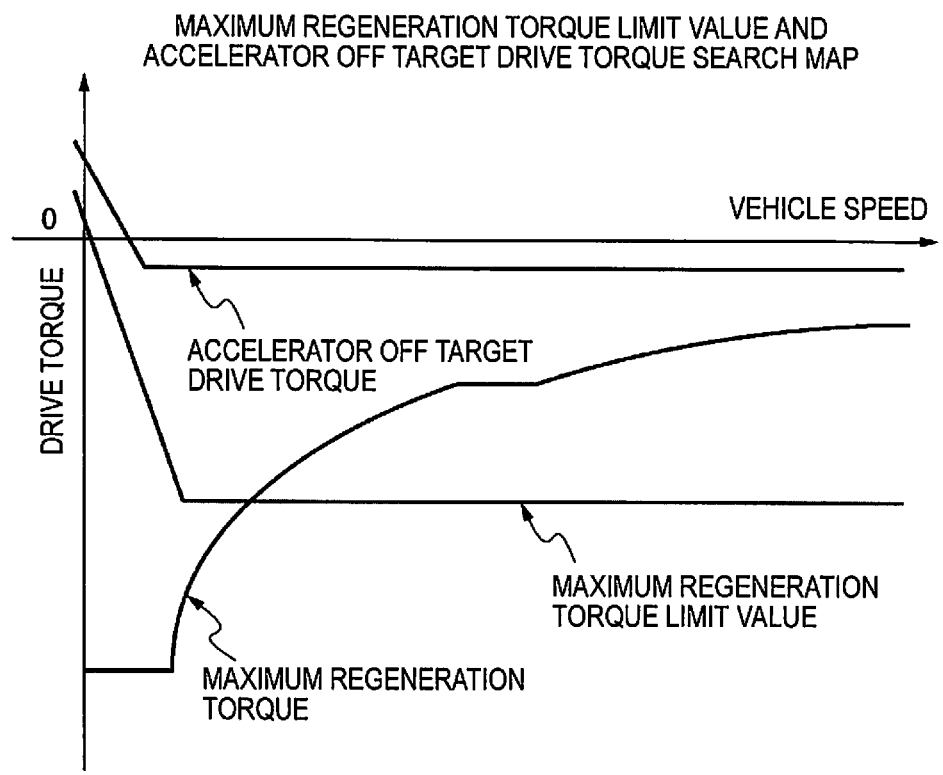
FIG. 5 is a diagram of a maximum regeneration torque limit value and an accelerator off target drive torque search map (embodiment).

Further, as illustrated in FIG. 5, the maximum regeneration torque limit value and the accelerator off target drive torque search map are set in the control means 17. In FIG. 5, the maximum regeneration torque limit value and the accelerator off target drive torque decrease so as to become a uniform value in a state where the vehicle speed is low, on the other hand, the maximum regeneration torque increases as the vehicle speed increases.

That is, in the embodiment, in the hybrid vehicle of a type in which the engine 2, the first motor generator 4, and the second motor generator 5 are connected to the drive shaft 8, the maximum regeneration torque basic value is calculated for each of two cases, the "case of operating the engine" and the "case of stopping the engine" by using the vehicle speed, the input limit value of the battery 18, the engine rotation speed, and the engine torque. Further, a maximum regeneration torque changing threshold value G is calculated as described above in a "case where the engine is stopped at an engine stop prohibition vehicle speed H as an EV running upper-limit vehicle speed". Furthermore, here, the torque in the braking direction is regarded as a "negative value", and the maximum regeneration torque indicates the torque in which the "negative value" becomes maximal.

Next, when the maximum regeneration torque basic value of the "case of operating the engine" is larger than the maximum regeneration torque changing threshold value G (in a small case as an absolute value), the maximum regeneration torque basic value of the "case of operating the engine" is set as the maximum regeneration torque. As another case, when the maximum regeneration torque basic value of the "case of stopping the engine" is smaller than the maximum regeneration torque changing threshold value G (in a large case as an absolute value), the maximum regeneration torque basic value of the "case of stopping the engine" is set as the maximum regeneration torque. Further, in a case which does not match any one of the above-described cases, the maximum regeneration torque changing threshold value G is set as the maximum regeneration torque, and the calculated maximum regeneration torque is used for the calculation of the final maximum regeneration torque.

Next, the calculation of the maximum regeneration torque of the embodiment will be described based on the flowchart of FIG. 2.

Figure 2:
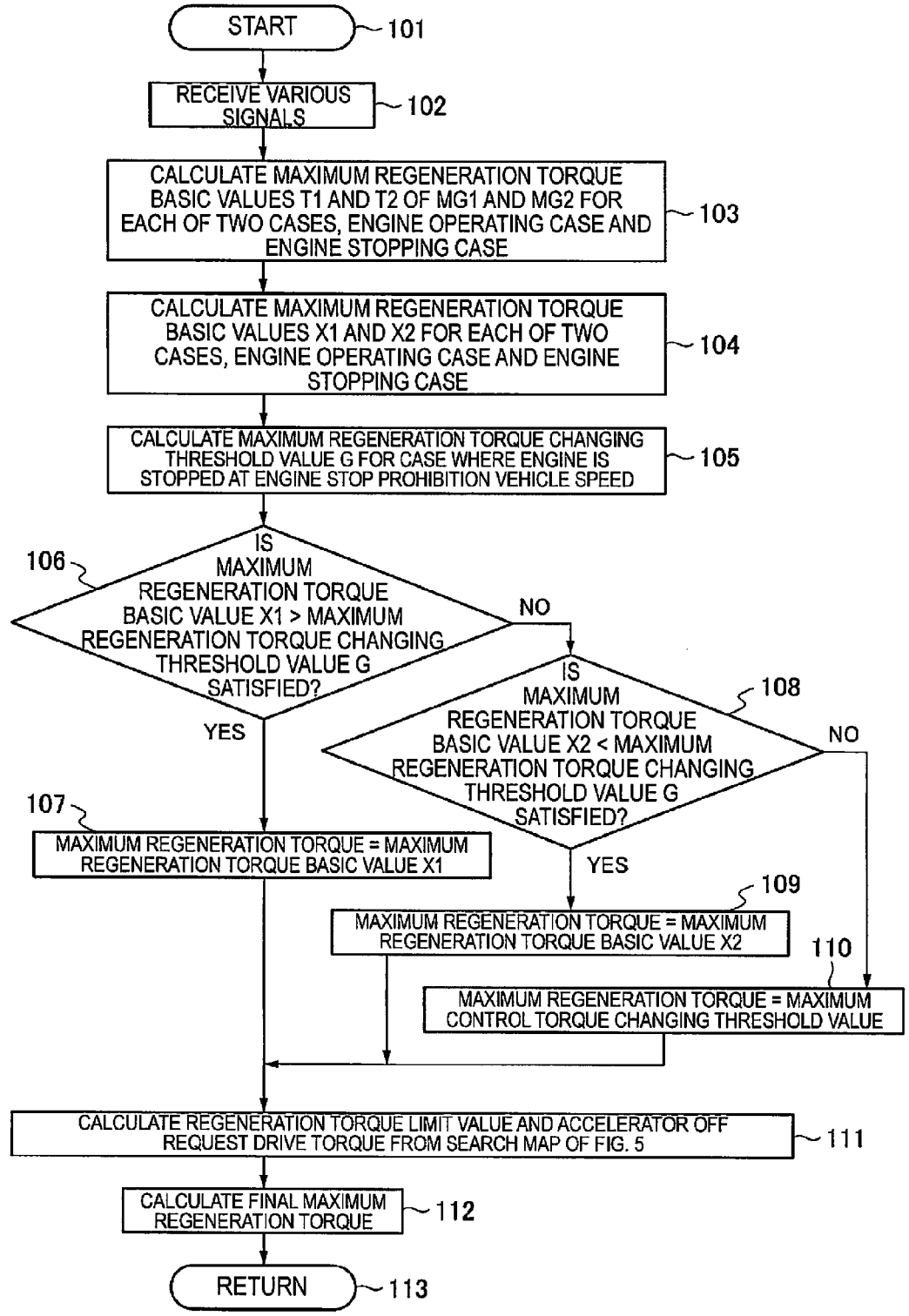
FIG. 2 is a flowchart that calculates a maximum regeneration torque (embodiment).

The routine of FIG. 2 is periodically executed.

As illustrated in FIG. 2, when the program of the control means 17 is started (step 101), the vehicle speed, the accelerator opening degree, and the input limit value are first received (step 102).

Then, for each of two cases, the "case of operating the engine" and the "case of stopping the engine", the first motor rotation speed and the second motor rotation speed necessary for the calculation of the maximum regeneration torques of the first motor generator 4 and the second motor generator 5 are calculated, and the maximum regeneration torque basic value T1 of the first motor generator 4 and the maximum regeneration torque basic value T2 of the second motor generator 5 are calculated (step 103).

In step 103, (Equation 1) and (Equation 2) below are first used for the calculation of the first motor rotation speed and the second motor rotation speed.

$$Nmg1 = (k1+1) \cdot Ne - k1 \cdot (1000/V1000) \cdot Vs \quad \text{(Equation 1)}$$

$$Nmg2 = (k2+1) \cdot (1000/V1000) \cdot Vs - k2 \cdot Ne \quad \text{(Equation 2)}$$

Figure 7:
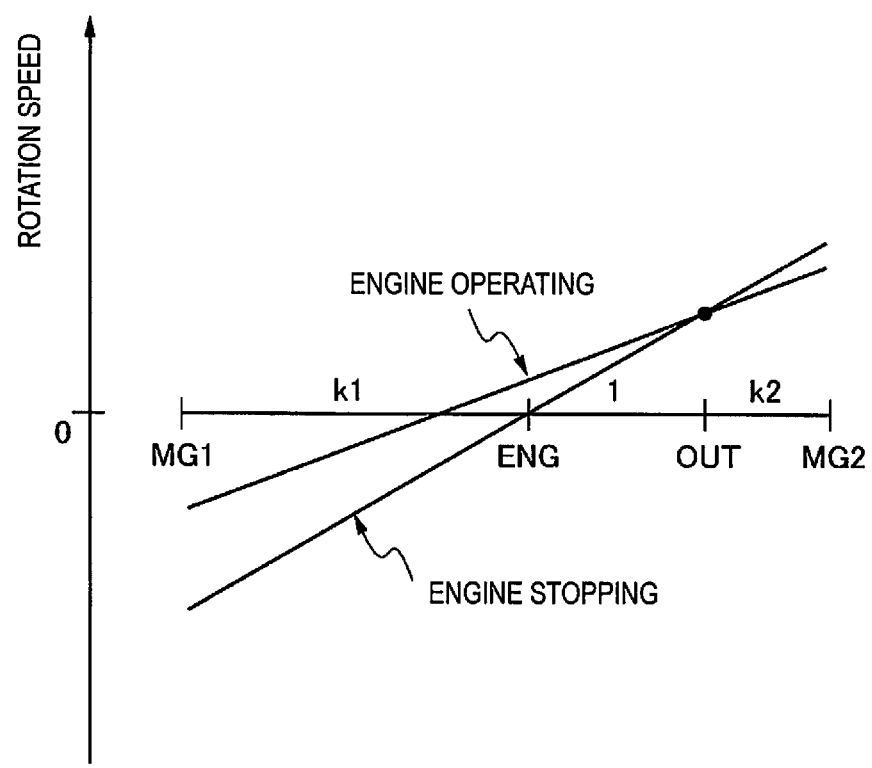
FIG. 7 is a diagram illustrating a relation of rotation speeds of respective rotation components of an engine (ENG), a first motor generator (MG1), a second motor generator (MG2), and a drive shaft (OUT) (embodiment).

In (Equation 1) and (Equation 2), as illustrated in FIG. 7,
k1: lever ratio of first motor generator (MG1)—engine (ENG) in case of "1" of engine (ENG)—drive shaft (OUT)
k2: lever ratio of drive shaft (OUT)-second motor generator (MG2) in case of "1" set for engine (ENG)-drive shaft (OUT)
Nmg1: first motor rotation speed of first motor generator
Nmg2: second motor rotation speed of second motor generator
Ne: engine rotation speed
Vs: vehicle speed V1000: vehicle speed in case of output shaft side rotation speeds of first planetary gear mechanism and second planetary gear mechanism set as 1000 [rpm]

Furthermore, FIG. 7 illustrates a relation of the rotation speeds of the respective rotation components of the engine (ENG) 2, the first motor generator (MG1) 4, the second motor generator (MG2) 5, and the drive shaft (OUT) 8.

Then, the calculation is executed by setting Ne=fuel cut engine rotation speed [rpm] (for example, 1000 [rpm]) in the "case of operating the engine" and setting Ne=0 [rpm] in the "case of stopping the engine".

Further, the maximum regeneration torque basic value T1 of the first motor generator 4 and the maximum regeneration torque basic value T2 of the second motor generator 5 are calculated by using (Equation 3) (power relation) and (Equation 4) (torque balance) below from the first motor rotation speed of the first motor generator 4, the second motor rotation speed of the second motor generator 5, the engine torque, and the input limit value of the battery 18 calculated for each of two cases, the "case of operating the engine" and the "case of stopping the engine" (step 104). Furthermore, the calculation is executed by using Te=fuel cut engine torque [Nm] (for example, −20 [Nm]) in the "case of operating the engine" and using Te=0 [Nm] in the "case of stopping the engine".

$$P = (Tmg1 \cdot Nmg1 + Tmg2 \cdot Nmg2) \cdot 2\pi/(60 \cdot 1000) \quad \text{(Equation 3)}$$

$$(k1+1) \cdot Tmg1 + Te = k2 \cdot Tmg2 \quad \text{(Equation 4)}$$

In (Equation 3) and (Equation 4),
Tmg1: torque of first motor generator
Tmg2: torque of second motor generator
P: input limit value of battery 13
Te: engine torque
k1: lever ratio of first motor generator (MG1)—engine (ENG) in case of "1" set for engine (ENG)—drive shaft (OUT)
k2: lever ratio of drive shaft (OUT)—second motor generator (MG2) in case of "1" set for engine (ENG)-drive shaft (OUT)

Then, the first maximum regeneration torque basic value X1 of the "case of operating the engine" and the second maximum regeneration torque basic value X2 of the "case of stopping the engine" are calculated by using (Equation 5) below from the maximum regeneration torque basic value T1 of the first motor generator 4, the maximum regeneration torque basic value T2 of the second motor generator 5, for the engine torque for each of two cases, the "case of operating the engine" and the "case of stopping the engine" (S104) (see FIG. 3).

$$Tdrive = (Tmg1 + Tmg2 + Te) \cdot GR \quad \text{(Equation 5)}$$

In (Equation 5),
Tdrive: drive torque
GR: speed reduction ratio from first planetary gear mechanism and second planetary gear mechanism to drive shaft.

Figure 3:
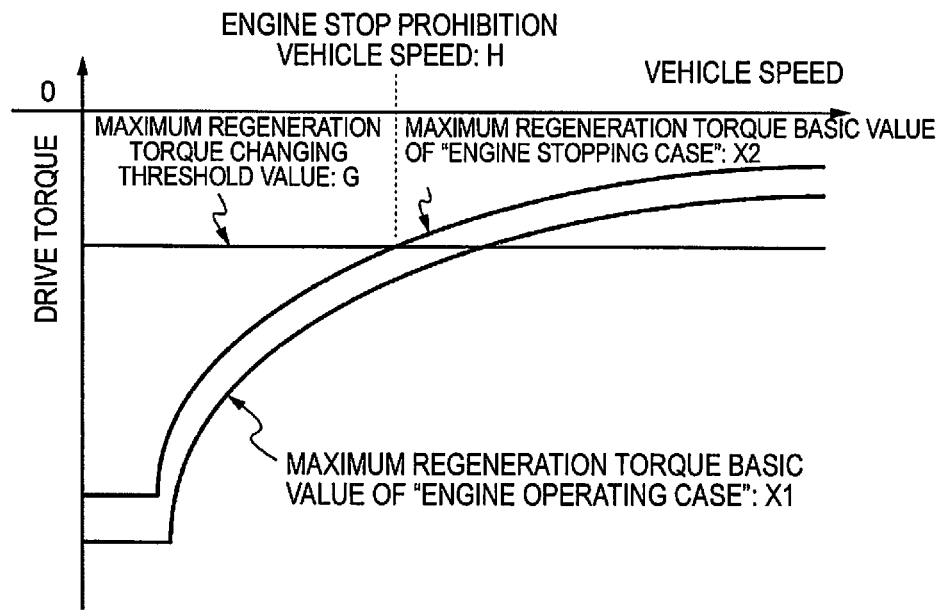
FIG. 3 is a diagram illustrating a relation between a maximum regeneration torque basic value and a maximum regeneration torque changing threshold value (embodiment).

Then, in the "case of stopping the engine at the engine stop prohibition vehicle speed", the maximum regeneration torque changing threshold value G in the case of stopping the engine at the engine stop prohibition vehicle speed is calculated by using (Equation 1) to (Equation 5) above as in the case of step 103 and step 104 (step 105) (see FIG. 3). Furthermore, Vs=engine stop prohibition vehicle speed [kph] (for example, 70[kph], Ne=0[rpm], Te=0 [Nm]) is used for the calculation of the maximum regeneration torque changing threshold value G.

Subsequently, the maximum regeneration torque is determined from the maximum regeneration torque basic value X1 of the "case of operating the engine", the maximum regeneration torque basic value X2 of the "case of stopping the engine", and the maximum regeneration torque changing threshold value G obtained from step 104 and step 105 (step 106). Furthermore, the relation of the maximum regeneration torque with respect to the maximum regeneration torque basic value X1 of the "case of operating the engine", the maximum regeneration torque basic value X2 of the "case of stopping the engine", and the maximum regeneration torque changing threshold value G is set as illustrated in FIG. 3.

First, when the maximum regeneration torque basic value X1 of the "case of operating the engine" is larger than the maximum regeneration torque changing threshold value G and step 106 is YES, the maximum regeneration torque basic value X1 of the "case of operating the engine" is set as the maximum regeneration torque (step 107).

Meanwhile, when step 106 is NO and the maximum regeneration torque basic value X1 of the "case of operating the engine" is smaller than the maximum regeneration torque changing threshold value G, it is determined whether the maximum regeneration torque basic value X2 of the "case of stopping the engine" is smaller than the maximum regeneration torque changing threshold value G (step 108).

When step 108 is YES and the maximum regeneration torque basic value X2 of the "case of stopping the engine" is smaller than the maximum regeneration torque changing threshold value G, the maximum regeneration torque basic value X2 of the "case of stopping the engine" is set as the maximum regeneration torque (step 109).

When step 108 is NO and the maximum regeneration torque basic value X2 of the "case of stopping the engine" is larger than the maximum regeneration torque changing threshold value G, the maximum regeneration torque changing threshold value G is set as the maximum regeneration torque (step 110).

Figure 4:
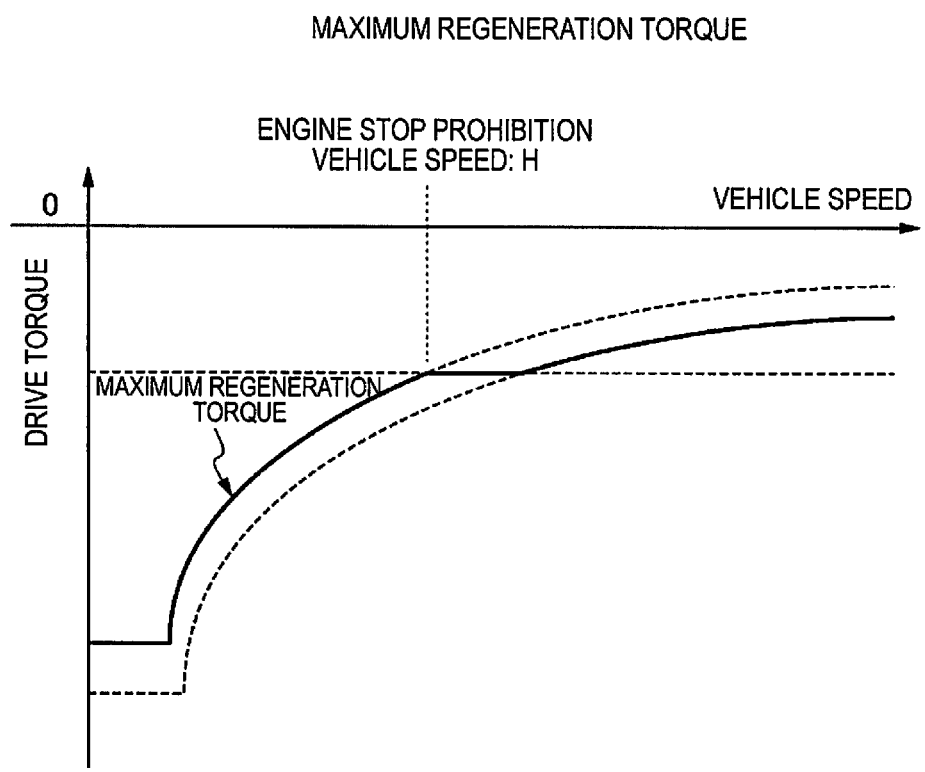
FIG. 4 is a diagram illustrating a variation in maximum regeneration torque (embodiment).

Accordingly, the maximum regeneration torque changes as illustrated in FIG. 4.

Then, the maximum regeneration torque limit value and the accelerator off target drive torque are calculated in response to the detected vehicle speed from the search map illustrated in FIG. 5 (step 111). Furthermore, the maximum regeneration torque limit value is provided so as to prevent the regeneration in a region in which the power may not be recovered to the battery 18 due to the loss. Further, the accelerator off target drive torque is a torque corresponding to the coasting deceleration when the accelerator is fully closed (a state where the accelerator is not stepped on).

Figure 6:
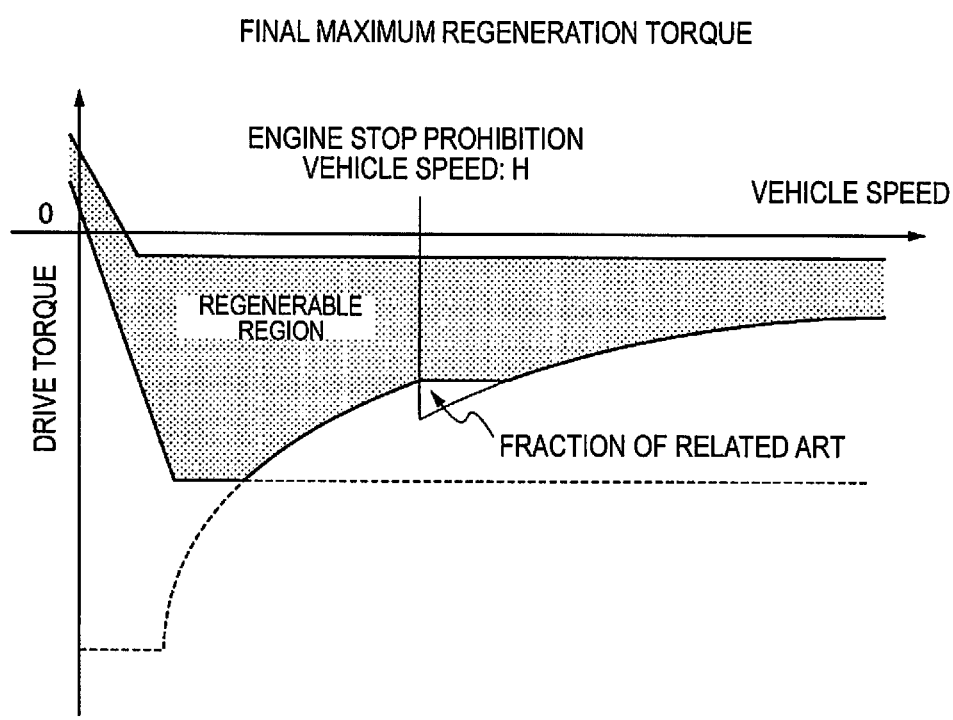
FIG. 6 is a diagram of a final maximum regeneration torque (embodiment).

Subsequently, the final maximum regeneration torque is calculated from the maximum regeneration torque obtained from step 107, step 109, and step 110 and the maximum regeneration torque limit value and the accelerator off target drive torque calculated from step 111 (step 112). In this case, a value obtained by subtracting the accelerator off target drive torque from a large value among the maximum regeneration torque and the maximum regeneration torque limit value is set as the final maximum regeneration torque (see FIG. 6). The final maximum regeneration torque is obtained as illustrated in FIG. 6, and an abrupt variation in maximum regeneration torque does not occur in a short time as in the related art.

Then, the program returns (step 113).

As a result, in the invention of claim 1, the control means 17 includes a motor rotation speed calculating means 17A which calculates the motor rotation speeds of the first motor generator 4 and the second motor generator 5, the input limiting means 17B which limits the amount of power to the battery 18 based on the state of the battery 18 as the electricity storing means, the motor generator regeneration torque calculating means 17C which calculates the motor generator regeneration torque from at least the motor rotation speed calculated by the motor rotation speed calculating means 17A and the input limit value for the battery 18 set by the input limiting means 17B, the maximum regeneration torque calculating means 17D which calculates the motor generator maximum regeneration torque necessary for supplying power from the first motor generator 4 and the second motor generator 5 to the battery 18 in a state where a brake force is output to the drive shaft 8 and calculates each of the engine operation maximum regeneration torque for the engine operation state changing in response to the vehicle speed detected by the vehicle speed detecting means 33 and the engine stop maximum regeneration torque for the engine stop state changing in response to the vehicle speed detected by the vehicle speed detecting means 33, and the change value calculating means 17E which sets the engine stop prohibition vehicle speed in which the engine 2 is not stopped when the vehicle speed is equal to or faster than the predetermined vehicle speed and calculates the maximum regeneration torque generated when stopping the engine 2 at the engine stop prohibition vehicle speed as the maximum regeneration torque changing threshold value from the engine stop regeneration torque of the maximum regeneration torque calculating means 17D.

Further, the value of the maximum regeneration torque changing in response to the vehicle speed detected by the vehicle speed detecting means 33 using the engine operation maximum regeneration torque and the engine stop maximum regeneration torque calculated by the maximum regeneration torque calculating means 17D is compared with the engine operation maximum regeneration torque and the maximum regeneration torque changing threshold value calculated by the change value calculating means 17E. As a result of a comparison, in a first case where the engine operation maximum regeneration torque is larger than the maximum regeneration torque changing threshold value calculated by the change value calculating means 17E, the value of the engine operation maximum regeneration torque is set as the maximum regeneration torque. In a second case where the engine operation maximum regeneration torque is equal to or smaller than the maximum regeneration torque changing threshold value calculated by the change value calculating means 17E and the engine stop maximum regeneration torque is smaller than the maximum regeneration torque changing threshold value calculated by the change value calculating means 17E, the value of the engine stop maximum regeneration torque is set as the maximum regeneration torque. In a third case where the engine operation maximum regeneration torque is equal to or smaller than the maximum regeneration torque changing threshold value calculated by the change value calculating means 17E and the engine stop maximum regeneration torque is equal to or larger than the maximum regeneration torque changing threshold value calculated by the change value calculating means 17E, the maximum regeneration torque changing threshold value calculated by the change value calculating means 17E is set as the maximum regeneration torque.

Accordingly, it is possible to suppress a variation in maximum regeneration torque which is generated when stopping the engine 2 from the operation state of the engine 2 in the vehicle braking state.

INDUSTRIAL APPLICABILITY

The control device according to the invention may be applied to various electric vehicles such as an electric automobile.

REFERENCE SIGNS LIST 1 hybrid vehicle control device
2 engine (ENG)
4 first motor generator (MG1)
5 second motor generator (MG2)
6 drive wheel
8 drive shaft (OUT)
9 power transmitting mechanism
15 first inverter
16 second inverter
17 control means
17A motor rotation speed calculating means
17B input limiting means
17C motor generator regeneration torque calculating means
17D maximum regeneration torque calculating means
17E change value calculating means
18 battery (electricity storing means)
32 accelerator opening degree detecting means
33 vehicle speed detecting means
34 battery charge state detecting means
35 engine rotation speed detecting means

The invention claimed is:

1. A hybrid vehicle which outputs power generated from an engine and a motor generator to a drive shaft through a power transmitting mechanism, the hybrid vehicle comprising:

an electricity storing means which can exchange power with the motor generator;

a vehicle speed detecting means which detects a vehicle speed; and a control means which includes a motor rotation speed calculating means that calculates a motor rotation speed of the motor generator, an input limiting means that limits the amount of power with respect to the electricity storing means based on a state of the electricity storing means, a motor generator regeneration torque calculating means that calculates a motor generator regeneration torque from at least a motor rotation speed calculated by the motor rotation speed calculating means and an input limit value set by the input limiting means, a maximum regeneration torque calculating means that calculates a motor generator maximum regeneration torque necessary for supplying power from the motor generator to the electricity storing means while a brake force is output to the drive shaft and calculates each of an engine operation maximum regeneration torque for operating the engine changing in accordance with the vehicle speed detected by the vehicle speed detecting means and an engine stop maximum regeneration torque for stopping the engine changing in accordance with the vehicle speed detected by the vehicle speed detecting means, and a change value calculating means that sets an engine stop prohibition vehicle speed in which the engine is not stopped when the vehicle speed is equal to or faster than a predetermined vehicle speed and calculates a maximum regeneration torque generated when stopping the engine at the engine stop prohibition vehicle speed as a maximum regeneration torque changing threshold value from the engine stop regeneration torque of the maximum regeneration torque calculating means, wherein the value of the maximum regeneration torque changing in accordance with the vehicle speed detected by the vehicle speed detecting means is compared with the engine operation maximum regeneration torque and the maximum regeneration torque changing threshold value calculated by the change value calculating means, the value of the engine operation maximum regeneration torque is set as the maximum regeneration torque in a first case where the engine operation maximum regeneration torque is larger than the maximum regeneration torque changing threshold value calculated by the change value calculating means, the value of the engine stop maximum regeneration torque is set as the maximum regeneration torque in a second case where the engine operation maximum regeneration torque is equal to or smaller than the maximum regeneration torque changing threshold value calculated by the change value calculating means and the engine stop maximum regeneration torque is smaller than the maximum regeneration torque changing threshold value calculated by the change value calculating means, and the maximum regeneration torque changing threshold value calculated by the change value calculating means is set as the maximum regeneration torque in a third case where the engine operation maximum regeneration torque is equal to or smaller than the maximum regeneration torque changing threshold value calculated by the change value calculating means and the engine stop maximum regeneration torque is equal to or larger than the maximum regeneration torque changing threshold value calculated by the change value calculating means.

* * * * *